MORRILL & BALDWIN.
Metal Boring Machine.
No. 7,604. Patented Aug. 27, 1850.
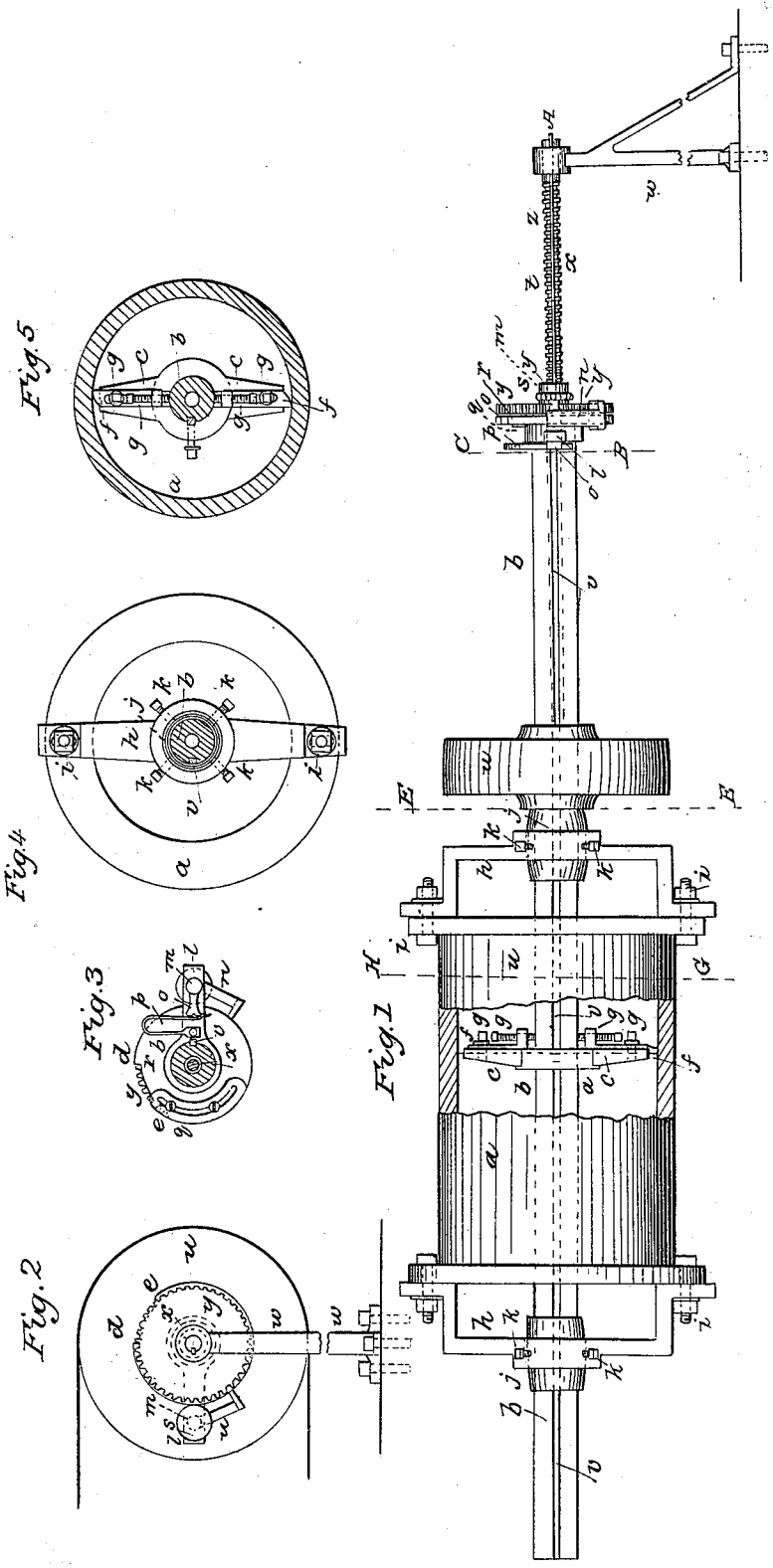

UNITED STATES PATENT OFFICE.

A. R. MORRILL AND H. BALDWIN, OF NASHVILLE, NEW HAMPSHIRE.

SELF-ACTING ADJUSTABLE FEED-GEAR FOR DRILLING-MACHINES.

Specification of Letters Patent No. 7,604, dated August 27, 1850.

*To all whom it may concern:*

Be it known that we, ALDEN R. MORRILL and HIRAM BALDWIN, of Nashville, in the county of Hillsboro and State of New Hampshire, have invented a new and useful improvement in the feed motion of machines for boring out steam-engine cylinders without detaching them from their place in the engine, particularly the cylinders of locomotive engines, and also applicable to drilling and boring of all kinds, of which the following is an exact description, taken in connection with the annexed drawings, forming part of this specification.

Figure 1 is a side elevation of the machine showing it attached to the cylinder, with a part of the cylinder broken away to show the cutters inside. Fig. 2 is an elevation of the end A, Fig. 1. Fig. 3 is a section on the line B, C, Fig. 1 looking toward A. Fig. 4 is a section on the line E, F, looking toward the cylinder. Fig. 5 is a section on the line G, H, looking toward I, and showing the cutters.

The part marked $a$, in Figs. 1, 4 and 5 is a steam engine cylinder, which may be in its place in the engine, with its heads removed to allow the shaft $b$, to pass through it. $c, c$, Figs. 1, and 5 are cutter carriers made fast to the shaft $b$.

$f, f$, are cutters and are adjusted to cut the required depth by the screws $g$.

$h, h$, are hangers bolted to the cylinder, by the bolts $i$, and carry the boxes $j, j$, and the shaft $b$. The boxes $j, j$, are the bearings for the shaft $b$, and are smaller than the sockets in the hangers $h, h$, which receive them to allow of their being adjusted to the center of the cylinder $a$, by the screws $k$. $l$, Figs. 1, 2 and 3 is a hub and projecting arm, and is fast to the shaft $b$. $m$, is a pin and has its bearing in the arm $l$. $n$, Figs. 1, 2 and 3 is a catch or dog, fast to the pin $m$. $o$, Figs. 1 and 3 is a small arm fast to the pin $m$. $p$, is a spring and acts against the arm $o$, and thereby keeps the catch or dog $n$, pressed against the wheel $r$. $s$, is a milled wheel fast to the pin $m$, by which the pin may be turned with the fingers and the catch or dog $n$ raised from the wheel $r$, at pleasure, and held away by the bow in the spring $p$, sinking into the hollow in the end of the arm $o$. $u$, is the main pulley for driving the shaft $b$, to which it is secured by a fast spline sliding in the groove $v$, of the shaft.

$w$, is a stand made fast to the floor of the shop or any other convenient place, and holds fast the screw $x$, both from revolving or moving in the direction of its length. $y$, Figs. 1, 2 and 3 is a toothed wheel with a screw cut in its hub and screws on to the screw $x$. The wheel $r$, is made a little larger than the wheel $y$, and is attached to the screw $x$, by means of a fast spline sliding in the groove $z$. The screw $x$, after screwing through the wheel $y$, and sliding through the wheel $r$, slides into the shaft $b$, which is made hollow to receive it.

Between $d$, and $e$, the circumference of the wheel $r$, is cut down to the depth of the teeth of the wheel $y$, to allow the catch or dog $n$, to drop or be pressed down at $d$, between the teeth of the wheel $y$, and cause that wheel to revolve until the catch reaches $e$, when the catch is raised by sliding up the inclined plane at $e$, represented by the dotted line in Fig. 2; the remainder of the wheel $r$, being larger than the wheel $y$, the catch is held away from the teeth of the wheel $y$, till it again arrives at $d$, and is then pressed down as before. The wheel $y$, being thus turned on the screw $x$, it is moved a little toward the cylinder, and pressing against the wheel $r$, and that against the shaft $b$, the shaft with the cutters $f, f$, is moved into the cylinder sufficient for the cutting of the next revolution. $q$, is a thin segment whose circumference coincides with that of the wheel $r$, to which it is attached by two screws passing through a slot parallel to its circumference as represented in Fig. 3. By slipping this segment upon the screws it may be so adjusted as to receive and lift out the catch $n$, at any desirable intermediate point between $d$, and $e$, Figs. 2 and 3. Thus if the space from $d$, to $e$, gives too much feed to the cutters, it may by this arrangement be diminished to any desirable extent.

What we claim as our invention and desire to secure by Letters Patent is—

The combination substantially as described, of the splined screw $x$, the splined shaft $b$, the smooth wheel $r$, the toothed wheel $y$, carrying a nut the arm $l$, the catch $n$, the small arm $o$, the spring $p$, and the segment $q$, so as to form a self acting adjustable feed for boring or drilling machines.

ALDEN R. MORRILL.
HIRAM BALDWIN.

Signed in presence of—
GEO. STARK,
WM. P. AINSWORTH.